M. HARTENHEIM.
CONTROL SYSTEM FOR BRIDGE TYPE PHASE SPLITTERS.
APPLICATION FILED FEB. 10, 1916. RENEWED MAY 13, 1918.
1,284,326.
Patented Nov. 12, 1918.
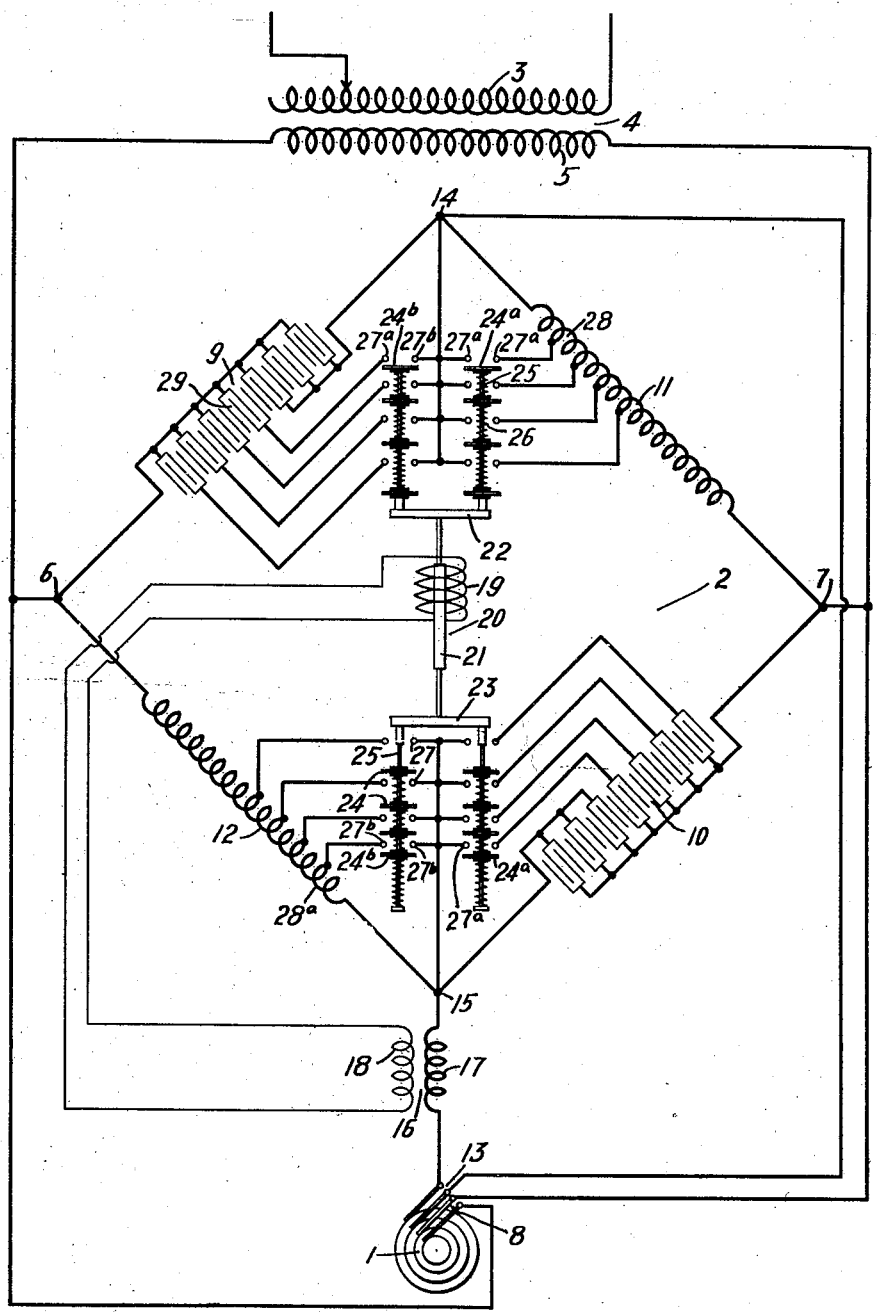
WITNESSES:
Fred A. Lind.
Geo. W. Hansen.
INVENTOR
Max Hartenheim
BY
Wesley G. Carr
ATTORNEY

UNITED STATES PATENT OFFICE.

MAX HARTENHEIM, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM FOR BRIDGE-TYPE PHASE-SPLITTERS.

1,284,326.     Specification of Letters Patent.     Patented Nov. 12, 1918.

Application filed February 10, 1916, Serial No. 77,404. Renewed May 13, 1918. Serial No. 234,308.

*To all whom it may concern:*

Be it known that I, MAX HARTENHEIM, a subject of the Emperor of Germany, and a resident of Pittsburgh, in the county of Allegheny and State of Pennsylvania, have invented a new and useful Improvement in Control Systems for Bridge-Type Phase-Splitters, of which the following is a specification.

My invention relates to alternating-current distributing systems and especially to control systems for polyphase apparatus, such as motors, generators, rotary converters, and the like that may operate on single-phase circuits through the intermediary of phase-splitting devices.

More particularly, my invention relates to means associated with an alternating-current system of the above indicated character whereby the voltage impressed upon the terminals of the aforesaid polyphase apparatus may be maintained balanced and equal irrespective of the loads imposed thereupon.

It is well known that when four elements of equal reactance, two being condensive and two being inductive, are connected in a closed circuit so as to alternate in position with one another, and an alternating-current voltage of the proper frequency is impressed across two opposite points of the closed circuit, a current of constant value may be obtained in a circuit that is connected across the other two opposite points of the closed circuit. This system of connection has been designated a mono-cyclic square in which the current flowing in the constant-current circuit is maintained, under certain conditions, 90 degrees out of phase relationship with the constant voltage impressed upon the square by the constant-potential circuit.

It is proposed to modify the aforementioned mono-cyclic square arrangement in order to utilize the same as a phase-splitting device whereby a polyphase motor, generator, rotary converter and the like, may be operated from a single-phase circuit by reason of the phase modification effected by a modified arrangement of the mono-cyclic square which I will designate as a bridge. In this bridge arrangement, the several reactances are so adjusted that, when a voltage of a certain predetermined frequency is impressed across one diagonal of the bridge, an equal voltage of the same frequency may be obtained from the other diagonal of the bridge, said second voltage being displaced 90 degrees in phase relationship from the first said voltage. It will be noted, therefore, that two voltages are available for operating a polyphase apparatus which are in strict polyphase relationship, that is, they are equal to, and displaced 90 degrees in phase relationship from, each other. This balancing of the voltages is maintained only when the load upon the motor is constant, or when the currents supplied to the several phases of the motor or apparatus are equal in value, which conditions obtain only when the load is maintained at a predetermined value. The reactances of the bridge are consequently selected in accordance with the phase-currents necessary for sustaining this predetermined load.

As the load upon the motor varies, resulting in a change in the current or currents supplied thereto, the voltage impressed across the bridge phase of the motor will change likewise, causing an abnormal difference of potential to exist across the corresponding diagonal of the bridge. The balance of the voltages impressed upon the several phases of the motor will be consequently disturbed which results from this distortion of the voltage, both in value and phase relationship, that is impressed across one of the two diagonals of the bridge. If the distortion in the voltages is sufficient, as a consequence of the unequal currents flowing in the several phases of the motor, the potential difference across one diagonal of the bridge may be sufficient to destroy the insulating properties of the reactance elements comprising the bridge.

In order to maintain a balanced condition between the voltages impressed upon the several phases of the apparatus through the intermediary of the bridge arrangement, under all load conditions, it is necessary to maintain the potentials of the four corners of the bridge equal, and this may be effected if the values of the capacity reactance elements are varied in direct proportion to the current supplied to the bridge-fed phase of the motor, while the values of the inductance elements, at the same time, are varied in inverse proportion thereto. To automatically effect this control of the values of the reactance elements comprising a bridge arrangement of the aforementioned character irrespective of the load conditions imposed upon the polyphase apparatus, I have invented the control system herein shown and described, by means of which the voltages impressed upon the several phases may be automatically maintained balanced.

For a better understanding of the scope of my invention, reference may be had to the single figure of the accompanying drawing in which a polyphase apparatus 1, represented as a two-phase motor, is furnished with polyphase currents thorugh a bridge arrangement 2. For convenience, a single-phase power supply circuit is connected to the motor 1 and the bridge 2 through a transformer 4, a primary winding 3 being connected directly to the supply circuit and a secondary winding 5 thereof being connected across one diagonal of the bridge 2 to the corners 6 and 7, substantially as shown. At the same time, a phase 8 of the polyphase motor 1 is connected to the corners 6 and 7, thereby being directly supplied from the single-phase circuit 3.

The brige 2 comprises a series of condensive reactance elements 9 and 10 and adjustable inductive reactance elements 11 and 12, the elements having different characteristics alternating in position, as shown, to form a closed circuit. Another phase 13 of the motor 1 is connected to corners 14 and 15 of another diagonal of the bridge 2. A series transformer 16 has a primary winding 17 connected in circuit with the bridge-phase 13 of the motor 1 and a secondary winding 18 connected to a coil 19 of an electromagnet 20 that comprises a core 21, an upper supporting member 22 and a lower supporting member 23. The members 22 and 23 are of similar construction but inverted in position, and each comprises a plurality of conducting bridging members 24 which slidingly engage rods 25. The several bridging members 24 mounted upon the rods 25 are spaced unequal distances from one another when the supports 22 and 23 are in their normal positions, as shown. The distance between the contact members 24 may be varied, however, by compressing spring members 26, which extend between adjacent members 24. The aforementioned arrangement permits the bridging members 24 to engage corresponding contact members 27 in succession as the core member 21 is drawn upwardly an increasing distance by the electromagnet 20.

We will assume that, under normal load conditions of the motor 1, the bridge 2 maintains the voltages impressed upon the several phases of the motor 1 balanced, that is, equal in value to, and displaced 90 degrees in phase relationship from, each other. As the load upon the motor 1 increases, the currents delivered to the several phases thereof must necessarily increase in value. As mentioned above, the variation in the current supplied to the bridge-fed phase 13 of the motor 1 will effect a distortion in the potential differences existing between the diagonally opposite corners 14 and 15 of the bridge 2, which disturbs the balanced relationship between the voltages applied to the several phases of the motor 1. It is, therefore, necessary, as explained above, to automatically control the values of the different reactance elements of the bridge in order to maintain balanced voltage conditions. This automatic regulation is effected through the electromagnet 20 which responds to the current flow through the series transformer 16 that is inserted in the bridge-fed phase of the motor. For a certain predetermined current variation from normal, the core 21 will be drawn upwardly a sufficient amount to effect engagement between the contact members $27^a$ and the bridging member $24^a$, and the contact members $27^b$ and the bridging member $24^b$. It will be noted that both the supports 22 and 23 will be simultaneously actuated to effect corresponding changes in the four elements of the bridge. In this instance, sections 28 and $28^a$ of the inductive reactance elements 11 and 12, respectively, are simultaneously cut out of circuit, and condensers 29 and $29^a$ are simultaneously cut into circuit, the values of the condensive reactance elements 29 and $29^a$ being directly proportional to the current variations in the bride-fed phase of the motor, and the values of the inductive reactance elements 28 and $28^a$ being inversely proportional to the same current variation. In other words, the balancing of the bridge is not disturbed, since corresponding amounts of capacity reactance are inserted in two opposite arms of the bridge while corresponding amounts of inductive reactance are disconnected from the other two arms of the bridge. Of coures, the values of the different elements to be disconnected and connected in their respective arms of the bridge 2 must be so determined as to maintain balanced voltages across the two diagonals of the bridge. This is easily determined because of the aforesaid relationship existing between the several elements comprising the bridge. If the current delivered to the bridge-fed phase 13 of the motor 1 tends to increase further, the core member 21 will be drawn upwardly a greater distance, thereby disconnecting more and more of the inductive reactance elements 11 and 12 from the bridge circuit and inserting more and more capacity reactance in the arms 9 and 10 of the bridge. The structure shown provides for four variations to be effected as the current in the bridge-fed phase of the motor decreases through a certain predetermined range.

It will be appreciated that the tuning of the bridge; that is, the resonant frequency, will not be disturbed by varying the values of the capacity and inductive reactances of the several arms of the bridge, because the capacity reactance is varied in direct proportion and the inductive reactance is varied in inverse proportion to the varying currents delivered to the bridge-fed phase of the motor, thereby maintaining their product constant. This may be readily seen by inspecting the well-known formula for the frequency, which is inversely proportional to the square root of the product of the capacity reactance and the inductive reactance.

The bridge is tuned for a particular frequency whereby, under normal conditions, the voltage impressed across the corners 7 and 14 is exactly equal to, and displaced 180 degrees in phase relationship from, the voltage impressed across the corners 7 and 15. Similarly, the voltage impressed across the corners 6 and 14 for the same frequency is exactly equal to, and displaced 180 degrees in phase relationship from, the voltage impressed across the corners 6 and 15. By varying the values of the reactance and condensive elements, as above mentioned, these resonant conditions are maintained irrespective of the current supplied to the bridge-fed phase of the motor 13, within a limited range. Moreover, the voltages impressed across the phases 8 and 13 will, under all conditions of load, be maintained equal to, and displaced 90 degrees in phase relationship from, each other, thereby permitting the motor 1 to be operated under balanced conditions as a two-phase motor irrespective of the loads imposed thereupon.

While the above description mentions only single-phase and two-phase circuits, it is not to be understood that this imposes a limitation and, furthermore, I do not intend to limit my invention to distributing systems in which the two-phase or polyphase circuits are supplied with power from the single-phase circuit, since the polyphase circuit may be the source of power supply while the single-phase circuit constitutes the power-consuming circuit.

While I have shown and described one embodiment of my invention, it will be understood that many modifications may be made therein without departing from the spirit and scope of the appended claims.

I claim as my invention:

1. The combination with a single-phase circuit and a polyphase circuit, of a phase-splitting device comprising static reactive elements only for interconnecting said circuits with each other, and means influenced by the current flow in one of the phases of said polyphase circuit for automatically adjusting the phase-splitting device to maintain balanced conditions in the polyphase circuit.

2. The combination with a single-phase circuit and a polyphase circuit, of a phase-splitting bridge comprising inductive and condensive reactance elements alternating in position with one another in a closed circuit for interconnecting said circuits with each other, and means for automatically varying the values of said reactance elements in accordance with the current flowing in one of the phases of the polyphase circuit.

3. The combination with a single-phase circuit and a polyphase circuit, of a phase-splitting bridge comprising inductive and condensive reactance elements alternating in position with one another in a closed circuit for interconnecting said circuits with each other, and means for automatically varying the values of said condensive reactance elements and inductive reactance elements, respectively, in direct proportion and in inverse proportion to the current flow in one of the phases of the polyphase circuit.

4. The combination with a single-phase circuit and a polyphase circuit, of a phase-splitting bridge comprising adjustable inductive and condensive reactance elements alternating in position with one another in a closed circuit for interconnecting said circuits with each other, and an electromagnet excited in accordance with the current flow obtaining in one phase of said polyphase circuit for automatically varying the condensive and inductive admittances of said phase-splitting bridge in proportion to the currents obtaining in the polyphase circuit.

5. The combination with a single-phase circuit and a polyphase circuit, of a phase-splitting bridge comprising adjustable inductive and condensive reactance elements alternating in position with one another in a closed circuit for interconnecting said circuits with each other, and means for varying the condensive and inductive admittances of said phase-splitting bridge in accordance with the current obtaining in the phase derived from said bridge.

6. The combination with a single-phase circuit and a polyphase circuit, of a phase-splitting bridge comprising adjustable inductive and condensive reactance elements alternating in position with one another in a closed circuit for interconnecting said circuits with each other, and means for varying the condensive and inductive admittances without varying the product of said admittances of the phase-splitting bridge in accordance with the current flow obtaining in the phase derived from said bridge.

In testimony whereof, I have hereunto subscribed my name this 4th day of Feb., 1916.

MAX HARTENHEIM.